United States Patent
Anthonappa et al.

(10) Patent No.: US 12,271,279 B2
(45) Date of Patent: Apr. 8, 2025

(54) SYSTEM AND METHOD FOR AUTONOMOUS TESTING, MACHINE-LEARNING MODEL-SUPERVISED PRIORITIZATION, AND RANDOMIZED WORKFLOW GENERATION

(71) Applicant: Cerner Innovation, Inc., Kansas City, MO (US)

(72) Inventors: Ranjeet Joseph Kumar Anthonappa, Bengaluru (IN); Venkata Nageswara Rao Desaraju, Bangalore (IN); Sneha Raveendran, Bengaluru (IN); Sudarshan Babu Kotapati, Bengaluru (IN)

(73) Assignee: Cerner Innovation, Inc., Kansas City, MO (US)

( * ) Notice: Subject to any disclaimer, the term of this patent is extended or adjusted under 35 U.S.C. 154(b) by 0 days.

(21) Appl. No.: 18/637,270

(22) Filed: Apr. 16, 2024

(65) Prior Publication Data

US 2024/0264913 A1    Aug. 8, 2024

Related U.S. Application Data

(63) Continuation of application No. 17/487,484, filed on Sep. 28, 2021, now Pat. No. 11,994,966.

(51) Int. Cl.
*G06F 11/22* (2006.01)
*G06F 11/263* (2006.01)
*G06N 20/00* (2019.01)

(52) U.S. Cl.
CPC ........ *G06F 11/2273* (2013.01); *G06F 11/263* (2013.01); *G06N 20/00* (2019.01)

(58) Field of Classification Search
CPC .... G06F 11/2273; G06F 11/263; G06N 20/00
See application file for complete search history.

(56) References Cited

U.S. PATENT DOCUMENTS

| 8,473,913 | B2 | 6/2013 | Noller et al. |
| 10,528,327 | B2 | 1/2020 | Kumar et al. |

(Continued)

FOREIGN PATENT DOCUMENTS

| CA | 2806732 A1 | 2/2012 |
| CA | 3103238 A1 | 12/2019 |

(Continued)

*Primary Examiner* — Matthew M Kim
*Assistant Examiner* — Indranil Chowdhury
(74) *Attorney, Agent, or Firm* — Invoke (57) ABSTRACT

Methods, systems, and computer-readable media are disclosed herein combine randomization functionalities with the machine-learning prioritization of workflows for performance testing. In aspects, a primary workflow having a sequence of user interface steps is input. Testing workflows are generated that represent each variable position of unlocked steps in the sequence of the primary workflow while maintaining the sequential position of any locked steps. These testing workflows are then ingested to a machine learning model that identifies as subset of the testing workflows to prioritize over other. Specifically, testing workflows are prioritized that at least partially match sequence patterns in historical workflow data that is associated with vulnerable computer code. The subset is output and tested by testing engine to generate a report of any vulnerable computer code.

20 Claims, 9 Drawing Sheets

(56) References Cited

U.S. PATENT DOCUMENTS

| | | | |
|---|---|---|---|
| 10,692,030 B2 * | 6/2020 | Haligowski | G06Q 10/0633 |
| 11,599,813 B1 | 3/2023 | Yuan et al. | |
| 2015/0304338 A1 | 10/2015 | Pherson et al. | |
| 2016/0188843 A1 | 6/2016 | Staples et al. | |
| 2017/0039046 A1 | 2/2017 | Henke et al. | |
| 2017/0364843 A1 | 12/2017 | Haligowski et al. | |
| 2019/0026634 A1 * | 1/2019 | Homeyer | G06N 20/00 |
| 2019/0205792 A1 * | 7/2019 | Huang | G06F 9/4881 |
| 2021/0304073 A1 * | 9/2021 | Li | G06N 20/00 |
| 2021/0383259 A1 | 12/2021 | Dmitriev et al. | |
| 2021/0383289 A1 * | 12/2021 | Dmitriev | G06F 9/3555 |
| 2022/0164184 A1 * | 5/2022 | Reddy | G06F 8/75 |
| 2022/0292416 A1 * | 9/2022 | Shetty | G06F 3/0482 |
| 2022/0374334 A1 * | 11/2022 | Brown | G06F 11/3688 |
| 2022/0374339 A1 | 11/2022 | Brown | |
| 2023/0055527 A1 | 2/2023 | Majithia et al. | |
| 2023/0318952 A1 * | 10/2023 | Schibler | G06F 9/44505 |
| | | | 709/224 |

FOREIGN PATENT DOCUMENTS

| | | | | |
|---|---|---|---|---|
| CA | 3179112 A1 * | 3/2024 | | G06Q 20/20 |
| GB | 2524737 A | 10/2015 | | |
| WO | 2007/081979 A2 | 7/2007 | | |
| WO | 2019/237094 A1 | 12/2019 | | |
| WO | WO-2022060411 A1 * | 3/2022 | | G06F 17/18 |
| WO | WO-2024147144 A1 * | 7/2024 | | |

* cited by examiner

| Workflow Editor | | | | | | | |
|---|---|---|---|---|---|---|---|
| VR Editor | JOB INFO | | | | | | Q Search here |
| Configure New Methods | Job ID | Job Name | Created By | Creation Date | Update Date | Job Status | Job Result | Job Details |
| Group Test Methods | 188 | PPSTabNavigation | AZ012789 | Oct 12, 2020 | Oct 12, 2020 | COMPLETED | FAILED | ▲ |
| Create Groups | 187 | PPSTabNavigation | AZ012789 | Oct 12, 2020 | Oct 12, 2020 | COMPLETED | FAILED | ▲ |
| | 186 | PPSTabNavigation_Scenario | AZ012789 | Oct 12, 2020 | Oct 12, 2020 | COMPLETED | FAILED | ▲ |
| Test Report | 185 | PPSTabNavigation_Scenario | AZ012789 | Oct 12, 2020 | Oct 12, 2020 | COMPLETED | FAILED | ▲ |
| | 184 | PPSTabNavigation_Scenario | AZ012789 | Oct 12, 2020 | Oct 12, 2020 | COMPLETED | FAILED | ▲ |
| | 183 | PPSTabNavigation_Scenario | AZ012789 | Oct 12, 2020 | Oct 12, 2020 | COMPLETED | FAILED | ▲ |
| | 182 | pps | AZ012789 | Oct 12, 2020 | Oct 12, 2020 | COMPLETED | FAILED | ▲ |
| | 181 | pps_job1 | AZ012789 | Oct 12, 2020 | Oct 12, 2020 | COMPLETED | FAILED | ▲ |
| | 180 | ppsTabNavigation | AZ012789 | Oct 12, 2020 | Oct 12, 2020 | COMPLETED | FAILED | ▲ |
| | 179 | ppsTabNavigation | AZ012789 | Oct 12, 2020 | Oct 12, 2020 | COMPLETED | FAILED | ▲ |
| | 178 | HOJ | AZ012789 | Oct 12, 2020 | Oct 12, 2020 | COMPLETED | FAILED | ▲ |
| | 177 | demoJob | AZ012789 | Oct 12, 2020 | Oct 12, 2020 | COMPLETED | PASSED | ▲ |

SYSTEM AND METHOD FOR AUTONOMOUS TESTING, MACHINE-LEARNING MODEL-SUPERVISED PRIORITIZATION, AND RANDOMIZED WORKFLOW GENERATION

INCORPORATION BY REFERENCE; DISCLAIMER

Each of the following applications are hereby incorporated by reference: Application Ser. No. 17/487,484 filed on Sep. 28, 2021, now U.S. Pat. No. 11,994,966. The applicant hereby rescinds any disclaimer of claim scope in the parent application(s) or the prosecution history thereof and advises the USPTO that the claims in the application may be broader than any claim in the parent application(s).

TECHNICAL FIELD

The present disclosure generally relates to a computing system that automatically and autonomously runs performance testing.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The present invention is defined by the claims as supported by the Specification, including the Detailed Description.

In brief and at a high level, this disclosure describes, among other things, methods, systems, and computer-readable media that combine randomization functionalities with the machine-learning prioritization of workflows for performance testing.

A computerized method is provided in an aspect of the present invention. The computerized method comprises receiving a primary workflow having a plurality of steps organized in a sequence. In aspects, a set of test workflows having randomized the sequence of at least one step in the plurality of steps of the primary workflow is generated. A subset of test workflows, within the set of test workflows, is identified that meets or exceeds a matching threshold to historical data. The subset of test workflows is communicated for display in a graphical user interface.

Another aspect provides one or more non-transitory computer-readable media having computer-executable instructions embodied thereon that, when executed, perform a method. The method comprises receiving a primary workflow having a plurality of steps organized in a sequence. A set of test workflows having randomized the sequence of at least one step in the plurality of steps of the primary workflow is generated. Generating the set of test workflows includes identifying at least one step having a locked position in the sequence of the primary workflow and at least one step having an unlocked position in the sequence of the primary workflow. Further, in aspects, the locked position relative to the unlocked position in the sequence of the primary workflow is identified, and each position in the sequence where the at least one step having the unlocked position can be placed while maintaining the position of the at least one step having the locked position in the sequence of the primary workflow is/are identified. A separate workflow for each position in the sequence where the at least one step having the unlocked position can be placed while maintaining the position of the at least one step having the locked position in the sequence of the workflow is generated. A subset of test workflows, within the set of test workflows, is identified that meets or exceeds a matching threshold to historical data. The subset of test workflows is communicated for display in a graphical user interface.

A system for prioritizing and testing user interface workflows based on machine learning models is provided in another aspect. The system comprises a processor, a machine learning prediction model, and a testing engine. The system is configured to receive a primary workflow having a plurality of steps organized in a sequence and generate a set of test workflows having randomized the sequence of at least one step in the plurality of steps of the primary workflow. Generating the set of test workflows includes identifying at least one step having a locked position in the sequence of the primary workflow and at least one step having an unlocked position in the sequence of the primary workflow. Further, the system identifies the locked position relative to the unlocked position in the sequence of the primary workflow. The system also identifies each position in the sequence where the at least one step having the unlocked position can be placed while maintaining the position of the at least one step having the locked position in the sequence of the primary workflow. Then, the system generates a separate workflow for each position in the sequence where the at least one step having the unlocked position can be placed while maintaining the position of the at least one step having the locked position in the sequence of the primary workflow. The machine learning prediction model in the system identifies a subset of test workflows, within the set of test workflows, that meets or exceeds a matching threshold to historical data. The subset of test workflows is communicated for display in a graphical user interface.

BRIEF DESCRIPTION OF THE DRAWINGS

Aspects are described in detail below with reference to the attached drawings figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

OVERVIEW

At a high level, aspects herein include an automated system that tests user interface workflows, including all objects and functions that are available within the user interface workflows. Via testing, the system can automatically identify one or more failures, errors, defects, and/or vulnerable computer code for those user interface workflow(s). The system actively tests the user interface workflows to test complex functionalities of objects such as input fields, selectable graphic objects, and even data input values in order to identify and predict computer code defects in the user interface workflow. Prior to testing, the system ingests a user interface workflow and performs randomization of the sequence of steps of that user interface workflow, which generates a plurality of test workflows (workflows to be tested) that represent each and every possible ordered combination of the steps in the user interface workflow. Prior to testing, the system also leverages machine-learning model(s) to identify a portion of the plurality of test workflows that were generated which are predicted, via the model(s), to meet or exceed a threshold of relevancy for testing. The portion of test workflows are automatically chosen by the system as test workflows that should be tested because those test workflows, based on the model(s), are the same or similar to one or more patterns recognized in other user interface workflows associated with known and/or documents failures, errors, defects, and/or vulnerable computer code. These prioritized test workflows are communicated to a computing device and displayed in a graphical user interface, for example. Based on user input to perform testing, one or more of the prioritized test workflows are tested by calling the test workflow identifier using one or more Application Programming Interfaces (APIs). The system, in an automated manner, performs each step in the sequence defined by the test workflow, logging any failures, errors, defects, and/or vulnerable computer code in an automatically generated and output report. The testing and reporting are performed in near real-time and in response to the user input to perform testing.

The combination of the system's randomization functionalities paired with the subsequent machine-learning prioritization of the test workflows provides an improvement over other systems.

DEFINITIONS

As used herein, a "workflow" describes a sequence of steps to be performed based on a user viewing a user interface, interacting with the user interface, and an application that runs the user interface responding or performing functions based on the particular interactions. Examples of interactions include input such as text input, voice input, and selections. A "selection" may refer to, for example, a right or left "click" using a mouse or cursor that is input to indication a selection of a graphic object like an icon for a button, a menu, a hyperlink, or to trigger a function such as the display of a pop-up menu, closing a window or tab, or performing a query using text/voice input.

The term "position" is used herein to refer to the location or placement of one user interface step in an ordered workflow relative to a preceding and/or a following step in the same workflow. As such, a workflow might include a first step that is followed by a second step, which is followed by a third step, and so on, until a terminal step or final step in the workflow. In this same regard, a "sequence" refers to a defined order of a plurality of steps that together form a workflow.

However, terms such as "primary" and "secondary", or "first" and "second", and other numerical terms, are used herein simply to differentiate between instances. These terms are not used as limitations nor as they used to indicate relative timing, order, placement, or the like, unless expressly described as such.

Herein, the term "locked" is used with regard to one or more steps of a workflow to refer to a computer function that electronically tags, labels, or assigns a fixed position to a particular and selected user interface step within a workflow. When locked, that particular and selected user interface step has an electronically set and "immovable" position relative to a preceding and/or a following step in the same workflow, independent of whether the preceding and/or the following step in the same workflow are locked or unlocked. As such, in an ordered workflow, a particular user interface step might be locked into a terminal position, for example. When locked, the particular user interface step cannot be moved, shifted, or repositions from the set position in the ordered workflow during the computer-autonomous randomized generation of test workflows, as later discussed herein.

Conversely, the term "unlocked" is used with regard to one or more steps of a workflow to [refer to a computer function that electronically tags, labels, or assigns a non-fixed position to a particular user interface step within a workflow. When unlocked, that particular user interface step is electronically set to be "movable" to any position within the workflow that is not held by one or more locked step(s), independent of whether the preceding and/or the following step in the same workflow are locked or unlocked. When unlocked, the particular user interface step can be moved, shifted, and/or repositioned to any of one or more unlocked positions in the ordered workflow during the computer-autonomous randomized generation of test workflows, as later discussed herein.

SYSTEM AND METHODS

Figure 1:
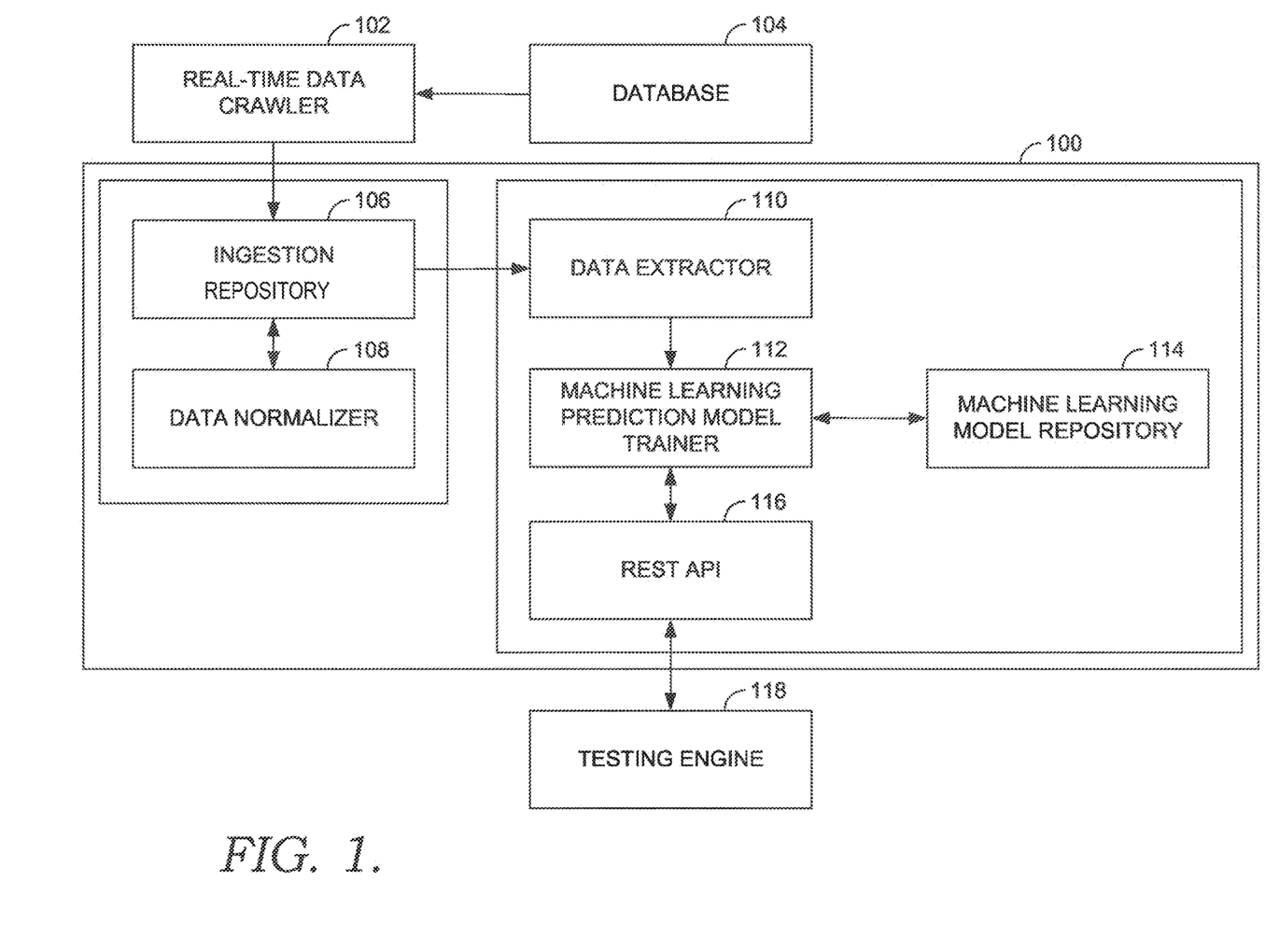
FIG. 1 is a block diagram of a system, in accordance with aspects of the present disclosure.

Turning now to FIG. 1, it illustrates an example of a system 100 for prioritizing and testing user interface workflows based on machine learning models. It will be understood by those of ordinary skill in the art that the environment is just one example of a suitable system for implementing media and methods described herein that is not intended to limit the scope of use or functionality of the present invention. The system 100 is simplified to illustrate devices, components, and modules in merely one of many suitable configurations and arrangements, such that configurations and arrangements of devices, components, and modules relative to one another, as well as the and the quantity of each of the devices, components, and modules, can vary from what is depicted (e.g., devices, components, and modules may be omitted and/or could be greater in quantity than shown). As such, the absence of components from FIG. 1 should be not be interpreted as limiting the present invention to exclude additional components and combination(s) of components. Similarly, the system 100 should not be interpreted as imputing any dependency between devices, components, and modules, and nor imputing any requirements with regard to each of the devices, components, modules, and combination(s) of such, as illustrated in FIG. 1. Also, it will be appreciated by those having ordinary skill in the art that the connections illustrated in FIG. 1 are also exemplary as other methods, hardware, software, and devices for establishing a communications link between the components, devices, systems, and entities, as shown in FIG. 1, may be utilized in implementation of the present invention. Although the connections are depicted using one or more solid lines, it will be understood by those having ordinary skill in the art that the exemplary connections of FIG. 1 may be hardwired or wireless, and may use intermediary components that have been omitted or not included in FIG. 1 for simplicity's sake.

In FIG. 1, a real-time data crawler 102 receives data from a database 104 and/or data streaming source. An ingestion repository 106 receives information from the real-time data crawler 102. In some aspects, the real-time data crawler 102 communicates data encoding a plurality of historical user interface workflows that have been previously tested for one or more clients to the ingestion repository. The ingestion repository 106 can pass all or a portion of the information to a data normalizer 108 that performs data cleansing and data normalization. As such, the data encoding a plurality of historical user interface workflows that have been previously tested for one or more clients can be cleansed and normalized. The cleansed and normalized data can be communicated to the ingestion repository 106. All or some of the cleansed and normalized data is then communicated from the ingestion repository 106 to the data extractor 110. The data extractor 110 processes the cleansed and normalized data to identify one or more of the historical user interface workflows encoded in the cleansed and normalized data. The data extractor 110 may also identify whether each of the historical user interface workflows has been tagged, labeled, or assigned a value that associates the corresponding historical user interface workflow with one or more failures, errors, defects, and/or vulnerable computer code, in some instances. The data extractor 110 also identifies, for each of the historical user interface workflows, the particular steps and the specific order of the steps in the sequence of the respective workflow. The extracted data may include data that particularly identifies a type or kind of technological problem (e.g., failures, errors, defects, and/or vulnerable computer code) that occurred in prior testing of the corresponding workflow, that specifically identifies each individual failure, error, defect, and/or vulnerable computer code to be distinguishable from other has failures, errors, defects, and/or vulnerable computer code, and/or that specifically identifies whether, based on prior testing, whether the corresponding historical user interface workflow ran successfully without failures, errors, defects, and vulnerable computer code. The data extractor 110 then passes the extracted data of the historical user interface workflows to the machine learning prediction model 112 along with data specifying whether each historical user interface workflow has been tagged, labeled, or assigned a value that associates the corresponding historical user interface workflow with one or more failures, errors, defects, and/or vulnerable computer code.

The machine learning prediction model 112 ingests the extract data. Automatically, using machine learning techniques, the machine learning prediction model 112 is trained (and/or is re-trained) such that the machine learning prediction model 112 learns to identify patterns associated with specific types or kinds of technological problems (e.g., failures, errors, defects, and/or vulnerable computer code) and/or patterns associated with that specifically identifies each individual failure, error, defect, and/or vulnerable computer code to be distinguishable from other has failures, errors, defects, and/or vulnerable computer code, as occurring for particular steps and the specific order of the steps in the sequences of the historical user interface workflows. Additionally or alternatively, the machine learning prediction model 112 is trained (and/or is re-trained) such that the machine learning prediction model 112 learns to identify patterns associated with historical user interface workflows that ran successfully without failures, errors, defects, and vulnerable computer code, in view of the particular steps and the specific order of the steps in the sequences of the historical user interface workflows. For example, for each of the plurality of historical workflows, the machine learning prediction model 112 identifies whether one or more code defect tags are associated with the historical workflow. The machine learning prediction model 112 also identifies patterns in the plurality of historical workflows that are associated with one or more code defect tags, and then storing the patterns in the machine learning model repository 114.

The machine learning prediction model 112 can be trained iteratively using additional and/or newly extract data over a period of time. Retraining might occur on a periodic basis, for example, in response to an indication that additional and/or newly extract data is available, or in response to receipt of one or more testing result reports from the testing engine 118. The patterns learned by the machine learning prediction model 112 can be stored for future reference and used in the machine learning model repository 114. The machine leaning model repository can include physical, virtual, and/or cloud-based memory.

The machine learning prediction model 112 can be subsequently used to perform model led prioritization of randomized test workflows generated in the system 100, so that prioritized test workflows can be run and tested, as explained below, and so the testing result reports can be used with the test workflows to retrain (and improve performance of) the machine learning prediction model 112.

Figure 3:
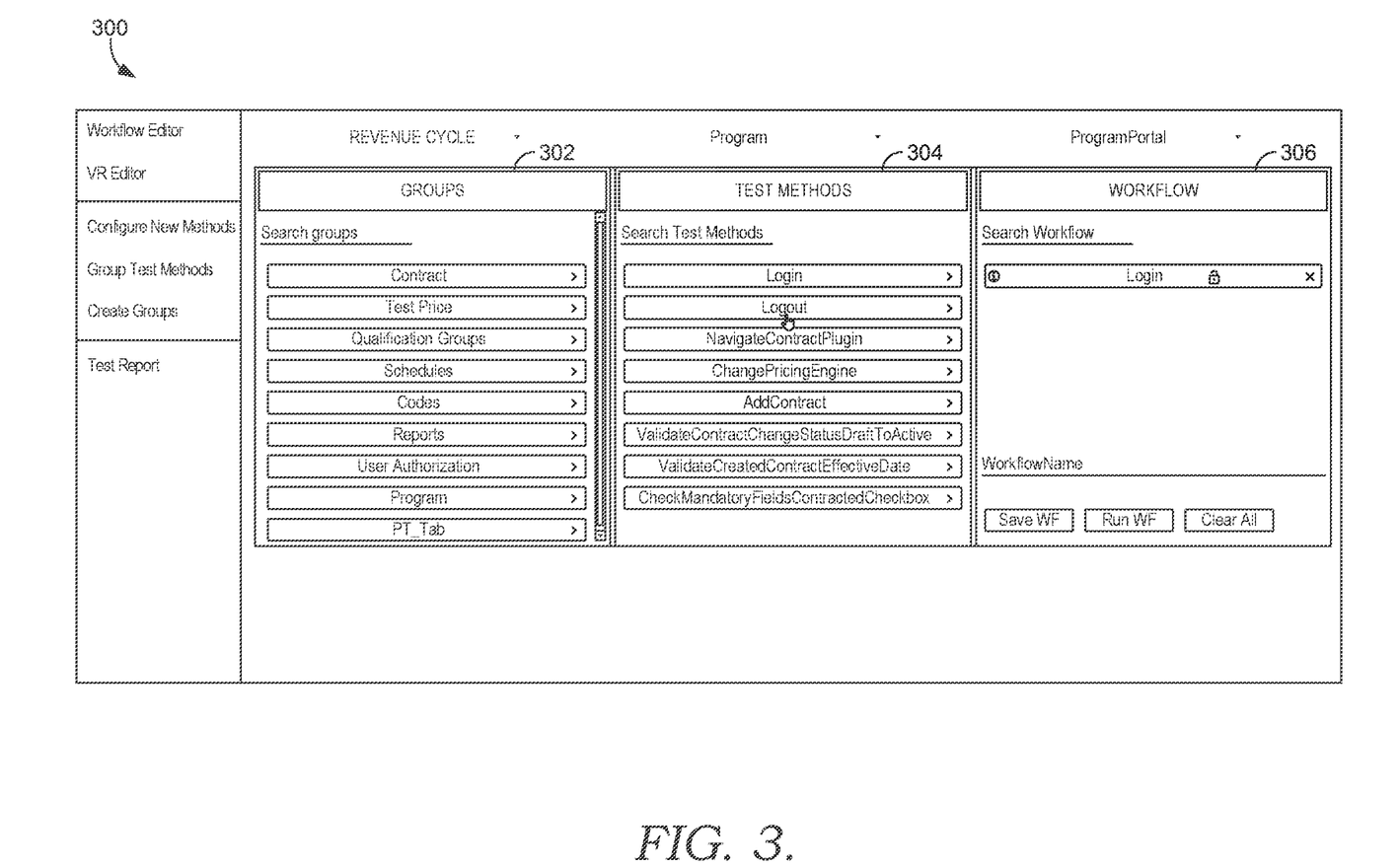
FIGS. 3-8 depict examples of graphical user interfaces displayed by an application that is suitable for interacting with the system of FIG. 1, in accordance with aspects of the present disclosure.
Figure 4:
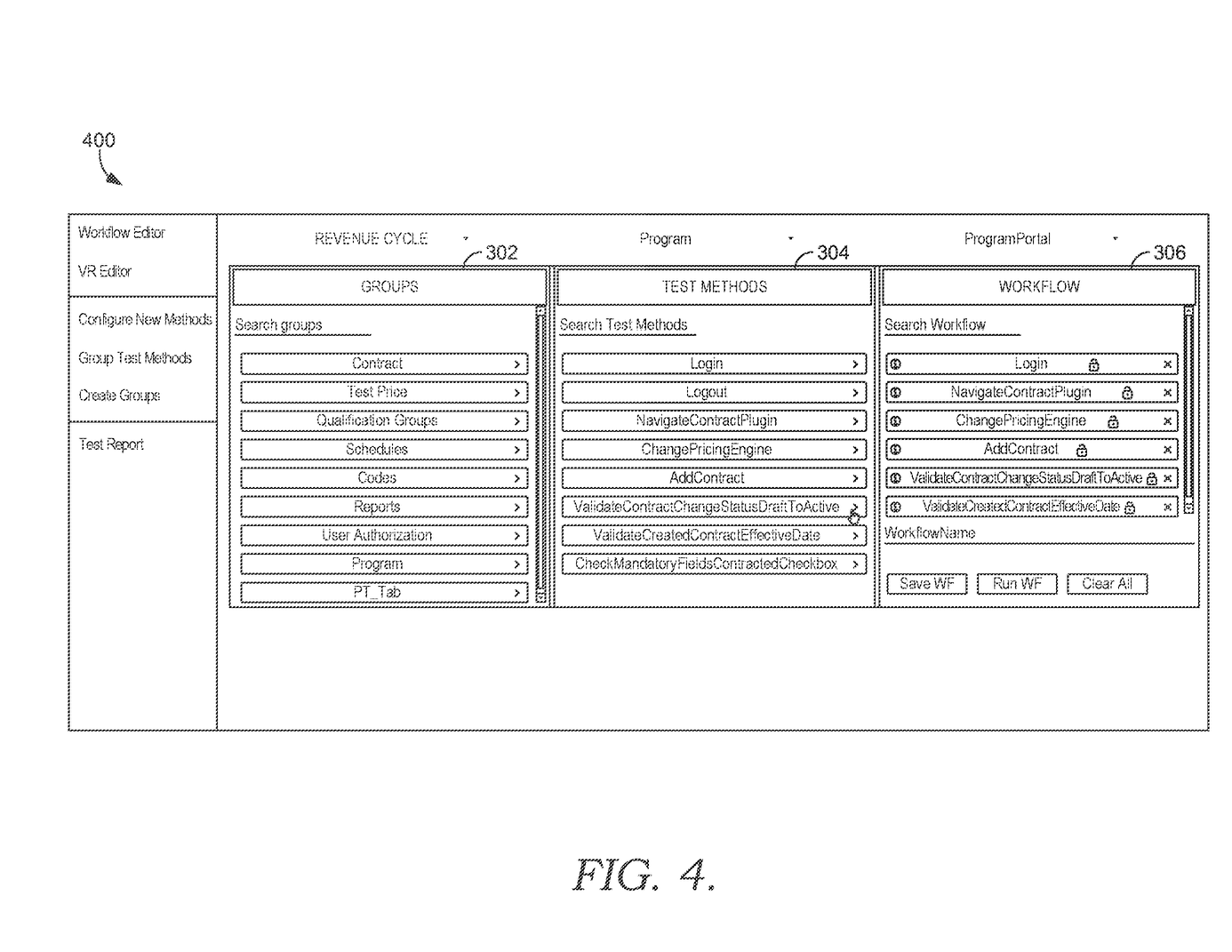
Figure 5:
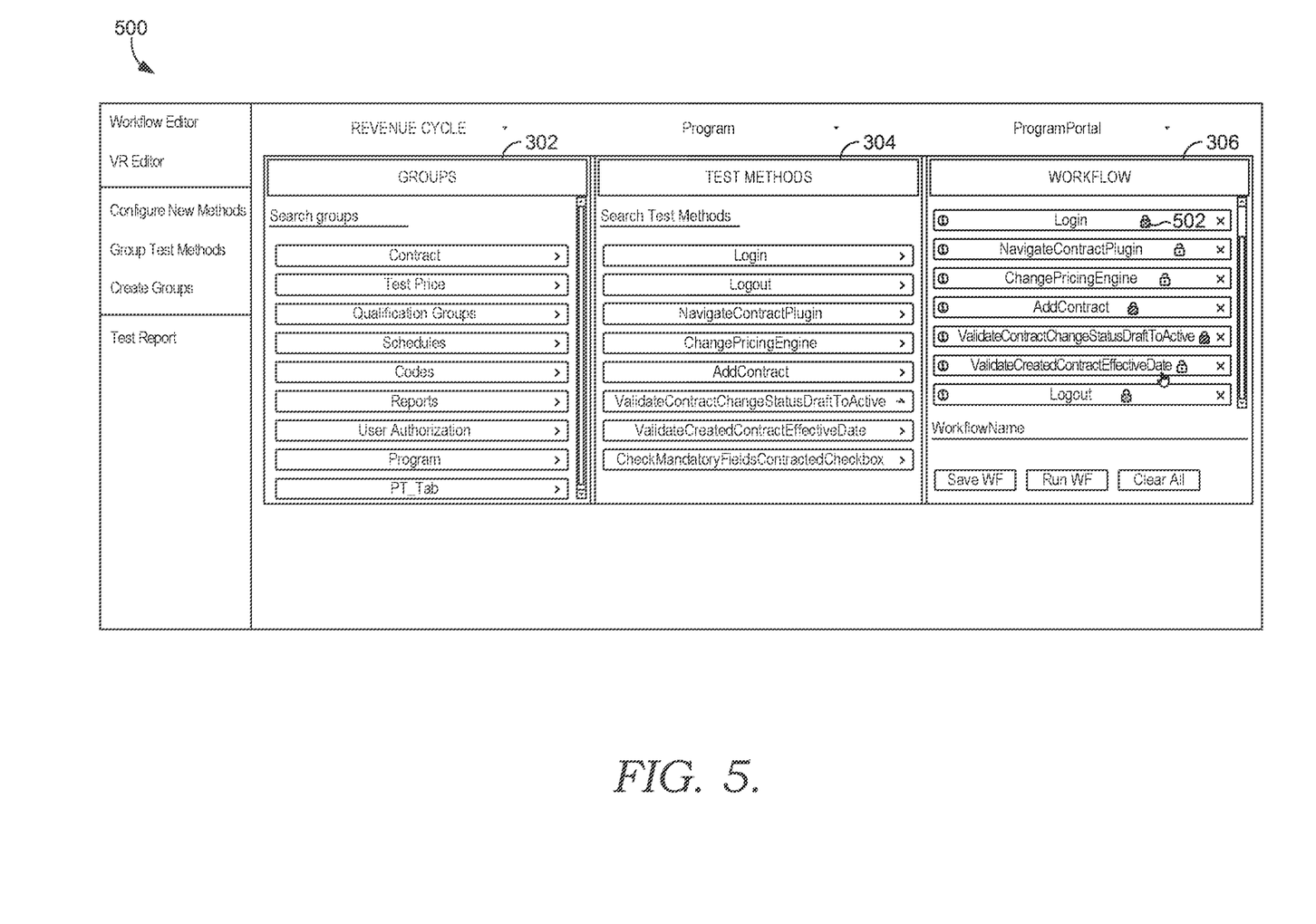

FIGS. 3-8 depict examples of graphical user interfaces displayed by an application that is suitable for interacting with the system 100 of FIG. 1, in accordance with aspects of the present disclosure. For example, a primary workflow having a plurality of steps organized in a sequence can be built, retrieved, or received into the system 100. FIG. 3 depicts a graphical user interface 300 for building a primary workflow to be input to the system 100. In the graphical user interface 300 depicts a "Workflow Editor" screen having selectable objects under a "Groups" 302 display area and a "Test Methods" 304 display area which can be populated into a "Workflow" display area (which correspond to the primary workflow being built). In response to a user selection of a category displayed as graphic buttons under "Groups" 302 display area such as "Contract", "Test Price", "Codes", or "Reports" in the graphical user interface 300, the "Test Methods" 304 display area is auto populated by the application with additional selectable items such as "Login" and "Logout". The items in the "Test Methods" 304 display area correspond to or represent specific interactions that can/could be performed in a user interface and/or test data that can be input to interact with a user interface. In response to a user selection of items displayed as graphic buttons in the "Test Methods" 304 display area, the items are auto populated by the application into the "Workflow" 306 display area, as shown in the graphical user interface 400 of FIG. 4. The items added to the "Workflow" 306 display area represent the steps in the primary workflow being built. In the "Workflow" 306 display area, the items displayed to represent the steps can be moved and repositioned in the sequence of the primary workflow being built, for example, by user input such as clicking-and-dragging the graphic button of an item to various locations relative to the other items in the "Workflow" 306 display area. Additionally, the items/steps added to the workflow being built can be individually locked or unlocked, for example as shown in the graphical user interface 500 of FIG. 5, by user input such as clicking the lock icon 502 to activate the lock (e.g., a filled-in or shaded lock shape), and clicking the lock icon again to deactivate the lock (e.g., an empty or outline of a lock shape) on the corresponding item/step. Once all the items displayed as graphic buttons are sequenced as desired via user input, an indication can be input to the application to save the primary workflow, to "run" the workflow for randomization and testing with the system 100, or to clear the "Workflow" display area.

Figure 6:
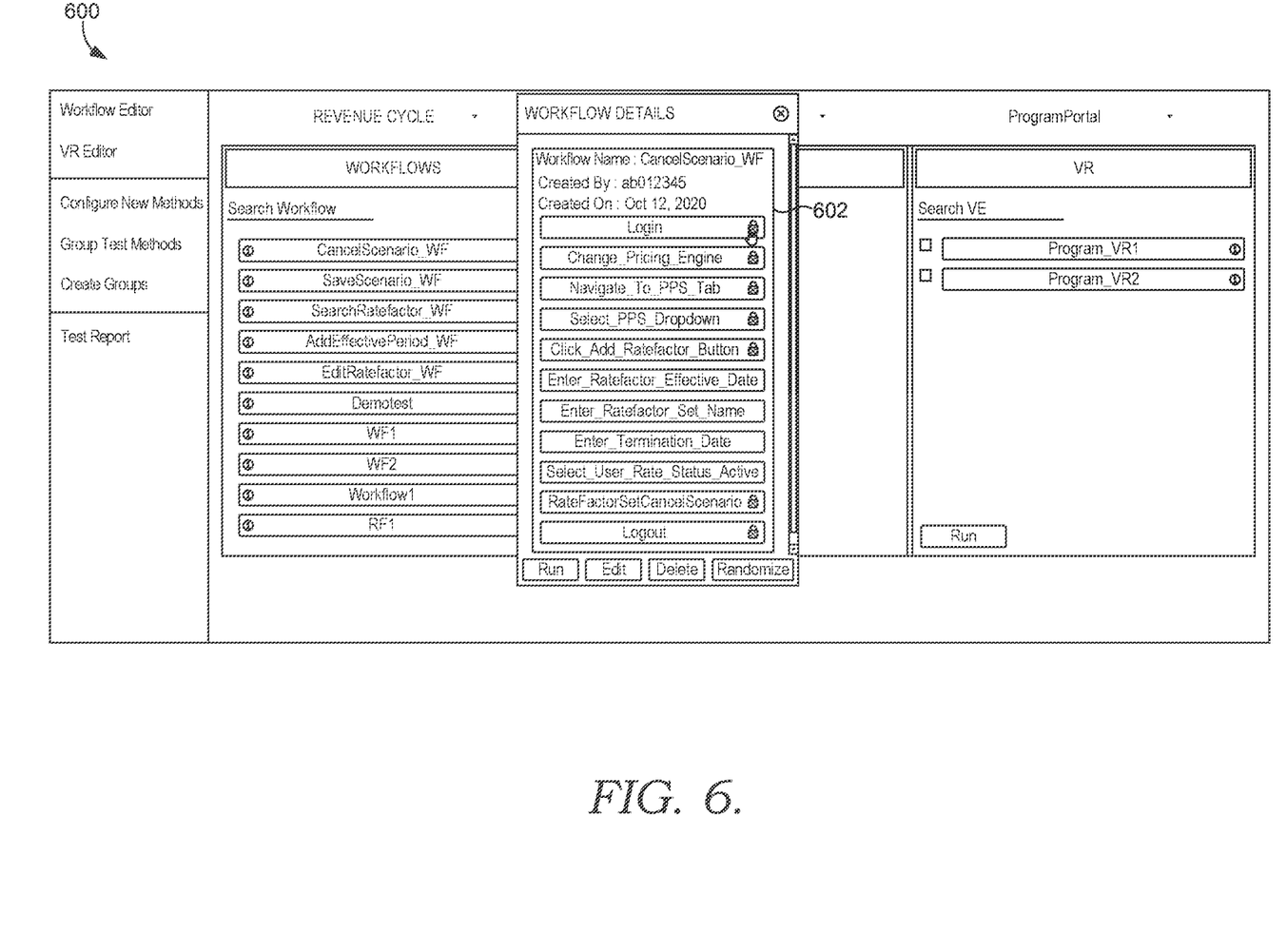
Figure 7:
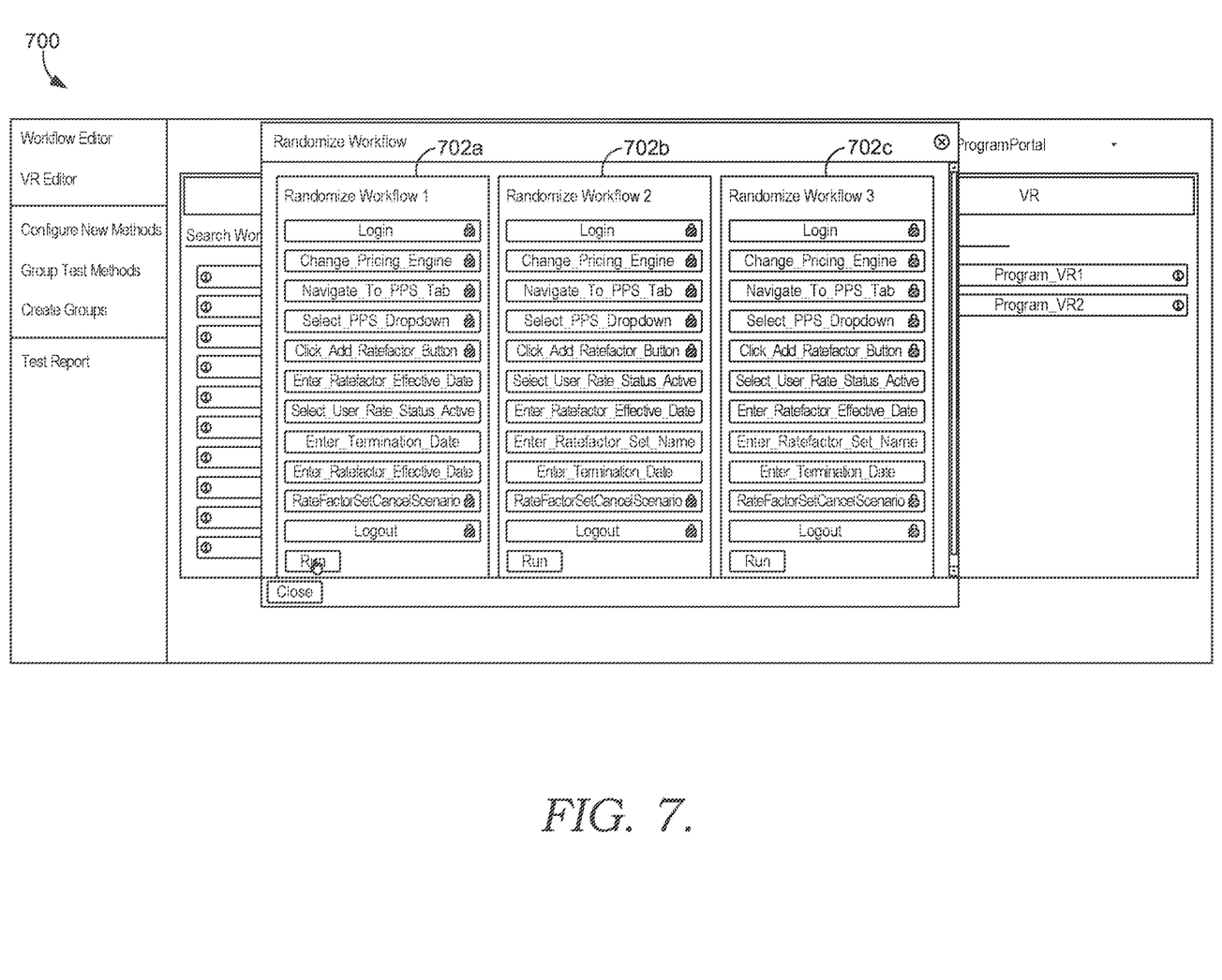
Figure 8:
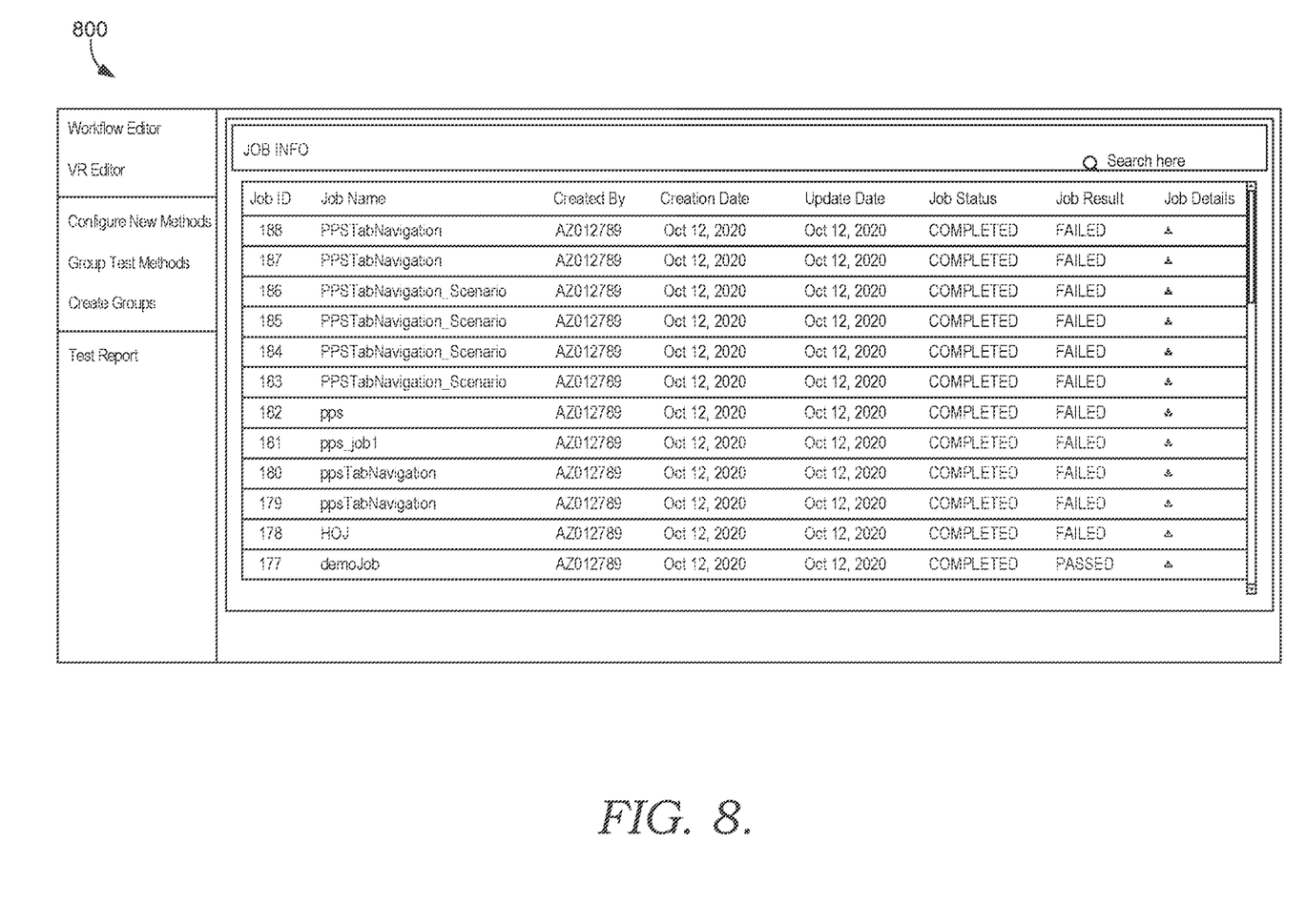

The graphical user interface 600 of FIG. 6 is displayed when the primary workflow 602 is ready for further actions in the system 100, via the application. The pop-up in FIG. 6 presents a primary workflow 602 that was built in the Workflow Editor, though different from the workflow discussed in FIGS. 3-5. The primary workflow 602 may be a historical workflow, a new workflow, an imported workflow, or other workflow created via the application, in various aspects. In aspects, the system 100 receives the primary workflow 602 having a plurality of steps organized in a sequence can be received into the system 100. The primary workflow 602 may be a historical workflow or a new workflow.

When a user input is received via the application requesting randomize the primary workflow 602, the system 100 proceeds to generate a set of test workflows having randomized the sequence of at least one step in the plurality of steps of the primary workflow 602. In order to generate the set of test workflows, the system 100 can identify at least one step having a locked position in the sequence of the primary workflow 602 and at least one step having an unlocked position in the sequence of the primary workflow 602. The system 100 may detect and identify which step(s) are locked and which step(s) are unlocked in the primary workflow 602. Further, the system 100 identifies the locked position(s) of one or more steps in sequence of the primary workflow 602 relative to the unlocked position(s) of one or more steps in the sequence of the primary workflow 602. The system 100 continues by identifying each position in the sequence where the at least one step having the unlocked position can be placed while maintaining the position of the at least one step having the locked position in the sequence of the primary workflow 602. In other terms, the system 100 operates to randomize the position(s) of a portion of, or all of, the unlocked steps in the primary workflow 602. At the same time, the system 100 purposefully does not change the position of any of the locked steps in the primary workflow 602. As such, the system 100 randomly generates a separate workflow until every combination of position for every unlocked step has been represented and captured. Thus, each position in the sequence where a step is in an unlocked position can be placed at any other position in the sequence where another step is in an unlocked position. All the while, the system 100 maintains the relative position(s) of steps that are locked in the sequence of the primary workflow 602. Further, system 100 identifies, via the machine learning prediction model 112, a subset of test workflows, within the set of test workflows, that meets or exceeds a matching threshold to historical data, as further discussed regarding methods hereinafter. The system 100 then communicates the subset of test workflows 702A, 702B, 703C for display and the application causes the subset of test workflows to be displayed, as shown in the graphical user interface 700 of FIG. 7.

In further aspects, the system 100 receiving, via the graphical user interface of the application, an indication to execute one or more of the subset of test workflows 702A, 702B, 703C, for example, based on user input. In response to the indication, the one or more of the subset of test workflows 702A, 702B, 703C are communicated to a testing engine 118, optionally using a Representational State Transfer (REST) API 116. The testing engine 118 tests each workflow in the subset by running each workflow, step-by-step, in the sequence defined by the locks and randomization discussed above. Then, the system 100 receives a performance report for the one or more of the subset of test workflows 702A, 702B, 703C, from the testing engine 118. The report(s) are stored and the application auto-populates the graphical user interface 800 of FIG. 8 to include selectable links to each of the report(s). The report(s) for each of the subset of test workflows that was tested include data specifying and identifying, when present, one or more failures, errors, defects, and/or vulnerable computer code for that workflow that were detected and/or that occurred when the workflow was being tested.

Figure 2:
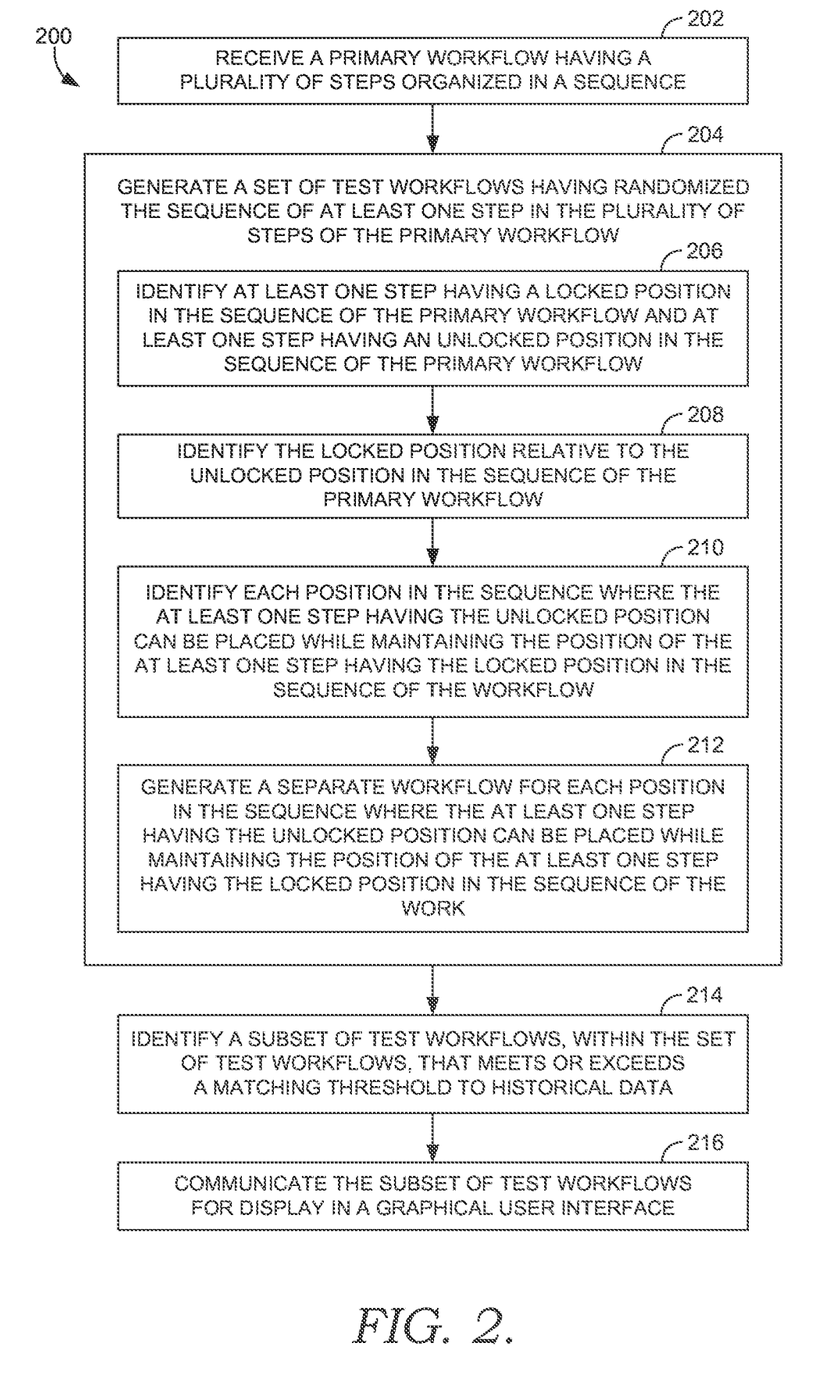
FIG. 2 is a block diagram of a flowchart of a method, in accordance with aspects of the present disclosure.

Continuing to FIG. 2, a method 200 is provided for prioritizing and testing user interface workflows based on machine learning models. In some aspects, the method 200 can be a computer-implemented method. In another aspect, one or more non-transitory computer-readable storage media having computer-readable instructions or computer-readable program code portions embodied thereon can, when executed by a processor, implement and/or perform the method 200. For example, computer-readable instructions or computer-readable program code portions can specify the performance of the method 200, can identify particular device(s), component(s), software, and/or hardware for performing the method 200, in various aspects. The computer-readable instructions or computer-readable program code portions can correspond to one or more applications or one or more APIs, in some aspects. In one aspect, the application or API can implement and/or perform the method 200. As discussed below, the method 200 can be performed using software, hardware, component(s), and/or device(s) depicted in the example of FIG. 1 and FIG. 9. For example, one or more steps of the method 200 can be performed at a computing device, server, or in a cloud, using one or more processors of the computing device, server, or cloud, so as to support an application. As will be understood by a skilled person in the art, the method 200 can be performed automatically and autonomously without user input, or with minimal user input, in various embodiments.

In accordance with the method 200, a primary workflow is received that has a plurality of steps organized in a sequence, shown at block 202. A set of test workflows is generated having randomized the sequence of at least one step in the plurality of steps of the primary workflow, indicated at block 204. Generating the set of test workflows includes, as shown at block 206, identifying at least one step having a locked position in the sequence of the primary workflow and at least one step having an unlocked position in the sequence of the primary workflow. At block 208, the locked position is identified relative to the unlocked position in the sequence of the primary workflow. And at block 210, each position in the sequence where the at least one step having the unlocked position can be placed is identified, while maintaining the position of the at least one step having the locked position in the sequence of the workflow. Continuing, a separate workflow is generated for each position in the sequence where the at least one step having the unlocked position can be placed while maintaining the position of the at least one step having the locked position in the sequence of the workflow, as shown at block 212.

Then, at block 214, a subset of test workflows are identified, within the set of test workflows, that meets or exceeds a matching threshold to historical data. In some aspects, for each test workflow of the set of test workflows generated, a machine learning model repository is queried to identify historical workflow patterns having a sequence that at least partially matches the sequence of the test workflow. In one example, a machine learning prediction model can determine when at least one of the historical workflow patterns has a sequence that at least partially matches 60% of the sequence of the test workflow, wherein 60% is the matching threshold. In response to determining that at least one of the historical workflow patterns has a sequence that at least partially matches 60% of the sequence of the test workflow, the test workflow is included in the subset to be communicated for display. In another example, the machine learning prediction model can determine when at least one of the historical workflow patterns has a sequence that at least partially matches 80% of the sequence of the test workflow, wherein 80% is the matching threshold. In response to determining that at least one of the historical workflow patterns has a sequence that at least partially matches 80% of the sequence of the test workflow, the test workflow is included the subset to be communicated for display. Each of the set of test workflows is evaluated by the machine learning prediction model to determine if the sequence and/or pattern matches, at least based on a threshold, one or more of the historical workflow patterns that has been tagged, labeled, or assigned a value that associates the corresponding historical workflow with one or more or more failures, errors, defects, and/or vulnerable computer code. The subset of test workflows are communicated for display in a graphical user interface, shown at block 216. This subset of test workflows is therefore prioritized over other test workflows that did not meet the matching threshold. The other or remaining test workflows in the set that did not meet the matching threshold are specially omitted and are not to be displayed because these remaining test workflows do not have a sequence and/or pattern that matches, at least based on a threshold, one or more of the historical workflow patterns that has been tagged, labeled, or assigned a value that associates the corresponding historical workflow with one or more failures, errors, defects, and/or vulnerable computer code. Thus, these remaining test workflows are predicted to be successfully when run and therefore do not need to be tested, relative to the subset of test workflows that did meet the matching threshold.

In further aspects, via a graphical user interface, an indication to execute one or more of the subset of test workflows can be received. In response to the indication, communicating the one or more of the subset of test workflows to a testing engine. The testing engine automatically tests each of the one or more test workflows in the subset of test workflows by running each test workflow, step-by-step, in the sequence defined by the locks and randomization. Then, a performance report for the one or more of the subset of test workflows is received from the testing engine. The report can include details of, when present, failures, errors, defects, and/or vulnerable code.

Figure 9:
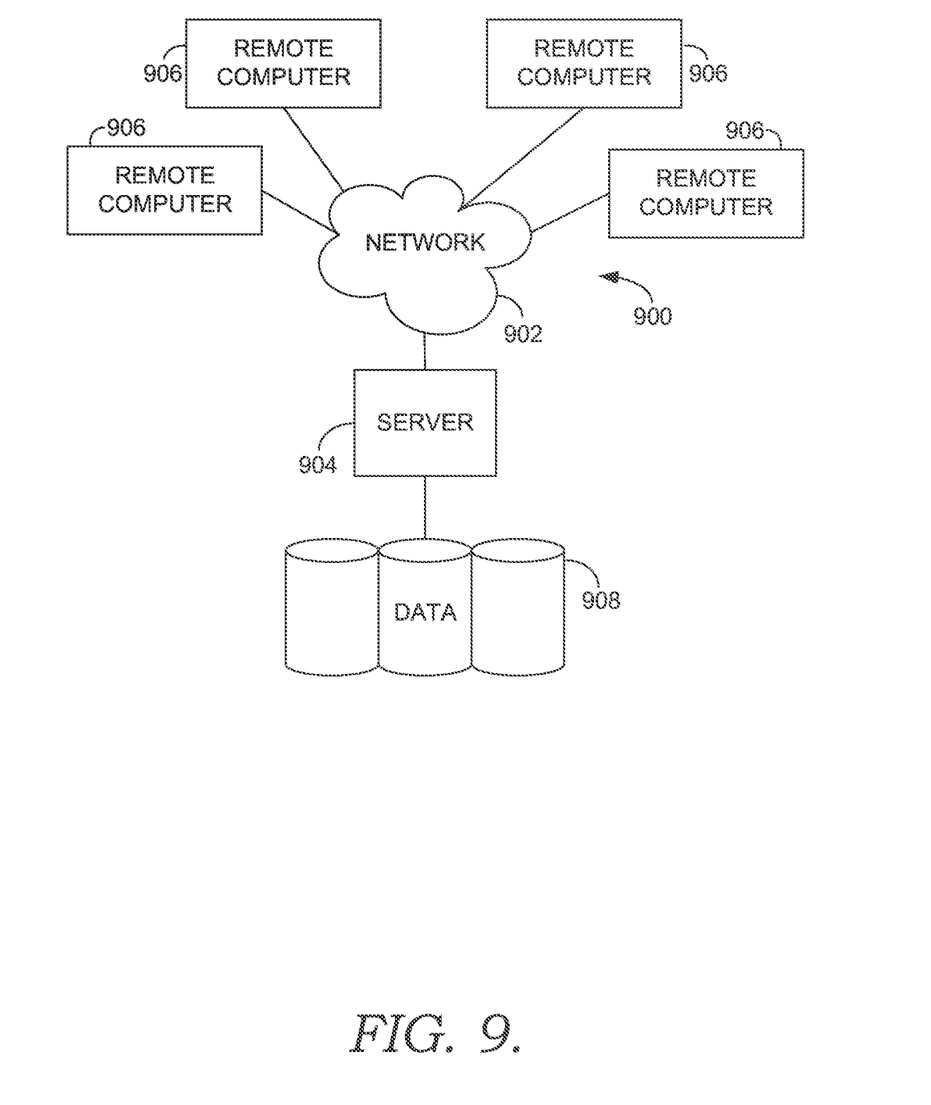
FIG. 9 is a diagram of an example computing environment that is suitable for implementation of the system, media, and methods discussed, in accordance with aspects of the present disclosure.

Beginning with FIG. 9, a computing environment 900 is depicted, in accordance with an aspect of the present invention. It will be understood by those of ordinary skill in the art that the computing environment 900 is just one example of a suitable computing environment and is not intended to limit the scope of use or functionality of the present invention. Similarly, the computing environment 900 should not be interpreted as imputing any dependency and/or any requirements with regard to each component and combination(s) of components illustrated in FIG. 9. It will be appreciated by those having ordinary skill in the art that the connections illustrated in FIG. 9 are also exemplary as other methods, hardware, software, and devices for establishing a communications link between the components, devices, systems, and entities, as shown in FIG. 9, may be utilized in implementation of the present invention. Although the connections are depicted using one or more solid lines, it will be understood by those having ordinary skill in the art that the exemplary connections of FIG. 9 may be hardwired or wireless, and may use intermediary components that have been omitted or not included in FIG. 9 for simplicity's sake. As such, the absence of components from FIG. 9 should be not be interpreted as limiting the present invention to exclude additional components and combination(s) of components. Moreover, though devices and components are represented in FIG. 9 as singular devices and components, it will be appreciated that some aspects may include a plurality of the devices and components such that FIG. 9 should not be considered as limiting the number of a device or component.

Continuing, the computing environment 900 of FIG. 9 is illustrated as being a distributed environment where components and devices may be remote from one another and may perform separate tasks. The components and devices may communicate with one another and may be linked to each other using a network 902. The network 902 may include wireless and/or physical (e.g., hardwired) connections. Examples of networks include a telecommunications network of a service provider or carrier, Wide Area Network (WAN), a Local Area Network (LAN), a Wireless Local Area Network (WLAN), a cellular telecommunications network, a Wi-Fi network, a short range wireless network, a Wireless Metropolitan Area Network (WMAN), a Bluetooth® capable network, a fiber optic network, or a combination thereof. The network 902, generally, provides the components and devices access to the Internet and web-based applications.

The computing environment 900 comprises a computing device in the form of a server 904. Although illustrated as one component in FIG. 9, the present invention may utilize a plurality of local servers and/or remote servers in the computing environment 900. The server 904 may include components such as a processing unit, internal system memory, and a suitable system bus for coupling to various components, including a database or database cluster. The system bus may be any of several types of bus structures, including a memory bus or memory controller, a peripheral bus, and a local bus, using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA®) local bus, and Peripheral Component Interconnect (PCI) bus, also known as Mezzanine bus.

The server 904 may include or may have access to computer-readable media. Computer-readable media can be any available media that may be accessed by server 904, and includes volatile and nonvolatile media, as well as removable and non-removable media. By way of example, and not limitation, computer-readable media may include computer storage media and communication media. Computer storage media may include, without limitation, volatile and non-volatile media, as well as removable and non-removable media, implemented in any method or technology for storage of information, such as computer-readable instructions, data structures, program modules, or other data. In this regard, computer storage media may include, but is not limited to, Random Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage device, or any other medium which can be used to store the desired information and which may be accessed by the server 904. Computer storage media does not comprise signals per se.

Communication media typically embodies computer-readable instructions, data structures, program modules, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

In aspects, the server 904 uses logical connections to communicate with one or more remote computers 906 within the computing environment 900. In aspects where the network 902 includes a wireless network, the server 904 may employ a modem to establish communications with the Internet, the server 904 may connect to the Internet using Wi-Fi or wireless access points, or the server 904 may use a wireless network adapter to access the Internet. The server 904 engages in two-way communication with any or all of the components and devices illustrated in FIG. 9, using the network 902. Accordingly, the server 904 may send data to and receive data from the remote computers 906 over the network 902.

Although illustrated as a single device, the remote computers 906 may include multiple computing devices. In an aspect having a distributed network, the remote computers 906 may be located at one or more different geographic locations. In an aspect where the remote computers 906 is a plurality of computing devices, each of the plurality of computing devices may be located across various locations such as buildings in a campus, medical and research facilities at a medical complex, offices or "branches" of a banking/credit entity, or may be mobile devices that are wearable or carried by personnel, or attached to vehicles or trackable items in a warehouse, for example.

In some aspects, the remote computers 906 is physically located in a medical setting such as, for example, a laboratory, inpatient room, an outpatient room, a hospital, a medical vehicle, a veterinary environment, an ambulatory setting, a medical billing office, a financial or administrative office, hospital administration setting, an in-home medical care environment, and/or medical professionals' offices. By way of example, a medical professional may include physicians; medical specialists such as surgeons, radiologists, cardiologists, and oncologists; emergency medical technicians; physicians' assistants; nurse practitioners; nurses; nurses' aides; pharmacists; dieticians; microbiologists; laboratory experts; genetic counselors; researchers; veterinarians; students; and the like. In other aspects, the remote computers 906 may be physically located in a non-medical setting, such as a packing and shipping facility or deployed within a fleet of delivery or courier vehicles.

Continuing, the computing environment 900 includes a data store 908. Although shown as a single component, the data store 908 may be implemented using multiple data stores that are communicatively coupled to one another, independent of the geographic or physical location of a memory device. Exemplary data stores may store data in the form of artifacts, server lists, properties associated with servers, environments, properties associated with environments, computer instructions encoded in multiple different computer programming languages, deployment scripts, applications, properties associated with applications, release packages, version information for release packages, build levels associated with applications, identifiers for applications, identifiers for release packages, users, roles associated with users, permissions associated with roles, workflows and steps in the workflows, clients, servers associated with clients, attributes associated with properties, audit information, and/or audit trails for workflows. Exemplary data stores may also store data in the form of electronic records, for example, electronic medical records of patients, transaction records, billing records, task and workflow records, chronological event records, and the like.

Generally, the data store 908 includes physical memory that is configured to store information encoded in data. For example, the data store 908 may provide storage for computer-readable instructions, computer-executable instructions, data structures, data arrays, computer programs, applications, and other data that supports the functions and action to be undertaken using the computing environment 900 and components shown in exemplary FIG. 9.

In a computing environment 900 having distributed components that are communicatively coupled via the network 902, program modules may be located in local and/or remote computer storage media including, for example only, memory storage devices. Aspects of the present invention may be described in the context of computer-executable instructions, such as program modules, being executed by a computing device. Program modules may include, but are not limited to, routines, programs, objects, components, and data structures that perform particular tasks or implement particular abstract data types. In aspects, the server 904 may access, retrieve, communicate, receive, and update information stored in the data store 908, including program modules. Accordingly, the server 904 may execute, using a processor, computer instructions stored in the data store 908 in order to perform aspects described herein.

Although internal components of the devices in FIG. 9, such as the server 904, are not illustrated, those of ordinary skill in the art will appreciate that internal components and their interconnection are present in the devices of FIG. 9. Accordingly, additional details concerning the internal construction device are not further disclosed herein.

The present invention has been described in relation to particular aspects, which are intended in all respects to be illustrative rather than restrictive. Further, the present invention is not limited to these aspects, but variations and modifications may be made without departing from the scope of the present invention.

The invention claimed is:

1. A method comprising:
    training a machine learning prediction model to identify
        patterns associated with a type of problem occurring for at least one of a step in a workflow or a specific order of steps in a workflow, based on at least one training dataset comprising a plurality of historical workflows and code defect tags associated with the plurality of historical workflows;

receiving a primary workflow having a plurality of steps organized in a sequence;

generating a set of test workflows having randomized the sequence of at least one step in the plurality of steps of the primary workflow;

identifying, by the machine learning prediction model, a subset of test workflows, within the set of test workflows, that meet or exceed a matching threshold to a pattern associated with a type of problem in a historical workflow;

communicating the subset of test workflows for display in a graphical user interface; and retraining the machine learning prediction model at least by iteratively applying the machine learning prediction model to additional training datasets and updating the machine learning prediction model based on results generated by iteratively applying the machine learning prediction model to the additional training datasets;

wherein the method is performed by at least one device including a hardware processor.

2. The method of claim 1, further comprising identifying at least one step having a locked position in the sequence of the primary workflow.

3. The method of claim 2, further comprising identifying at least one step having an unlocked position in the sequence of the primary workflow.

4. The method of claim 3, further comprising identifying the locked position relative to the unlocked position in the sequence of the primary workflow.

5. The method of claim 4, further comprising identifying each position in the sequence where at least one step having the unlocked position can be placed while maintaining the position of at least one step having the locked position in the sequence of the primary workflow.

6. The method of claim 5, further comprising generating a separate workflow for each position in the sequence where the at least one step having the unlocked position can be placed while maintaining the position of the at least one step having the locked position in the sequence of the primary workflow.

7. The method of claim 1, further comprising:

receiving, via the graphical user interface, an indication to execute one or more of the test workflows in the subset of test workflows;

in response to the indication, communicating the one or more of the test workflows in the subset of test workflows to a testing engine; and receiving, from the testing engine, a performance report for the one or more of the test workflows in the subset of test workflows to the testing engine.

8. One or more non-transitory computer readable media comprising instructions which, when executed by one or more hardware processors, cause performance of operations comprising:

training a machine learning prediction model to identify patterns associated with a type of problem occurring for at least one of: a step in a workflow or a specific order of steps in a workflow, based on at least one training dataset comprising a plurality of historical workflows and code defect tags associated with the plurality of historical workflows;

receiving a primary workflow having a plurality of steps organized in a sequence;

generating a set of test workflows having randomized the sequence of at least one step in the plurality of steps of the primary workflow;

identifying, by the machine learning prediction model, a subset of test workflows, within the set of test workflows, that meet or exceed a matching threshold to a pattern associated with a type of problem in a historical workflow;

communicating the subset of test workflows for display in a graphical user interface; and retraining the machine learning prediction model at least by iteratively applying the machine learning prediction model to additional training datasets and updating the machine learning prediction model based on results generated by iteratively applying the machine learning prediction model to the additional training datasets.

9. The non-transitory media of claim 8, the operations further comprising identifying at least one step having an unlocked position in the sequence of the primary workflow.

10. The non-transitory media of claim 9, the operations further comprising identifying at least one step having a locked position in the sequence of the primary workflow.

11. The non-transitory media of claim 10, the operations further comprising identifying the locked position relative to the unlocked position in the sequence of the primary workflow.

12. The non-transitory media of claim 11, the operations further comprising identifying each position in the sequence where at least one step having the unlocked position can be placed while maintaining the position of at least one step having the locked position in the sequence of the primary workflow.

13. The non-transitory media of claim 12, the operations further comprising generating a separate workflow for each position in the sequence where the at least one step having the unlocked position can be placed while maintaining the position of the at least one step having the locked position in the sequence of the primary workflow.

14. The non-transitory media of claim 8, the operations further comprising:

receiving, via the graphical user interface, an indication to execute one or more of the test workflows in the subset of test workflows;

in response to the indication, communicating the one or more of the test workflows in the subset of test workflows to a testing engine; and receiving, from the testing engine; a performance report for the one or more of the test workflows in the subset of test workflows to the testing engine.

15. A system comprising:

at least one device including a hardware processor;

the system being configured to perform operations comprising:

training a machine learning prediction model to identify patterns associated with a type of problem occurring for at least one of a step in a workflow or a specific order of steps in a workflow, based on at least one training dataset comprising a plurality of historical workflows and code defect tags associated with the plurality of historical workflows;

receiving a primary workflow having a plurality of steps organized in a sequence;

generating a set of test workflows having randomized the sequence of at least one step in the plurality of steps of the primary workflow;

identifying, by the machine learning prediction model, a subset of test workflows, within the set of test workflows, that meet or exceed a matching threshold to a pattern associated with a type of problem in a historical workflow;

communicating the subset of test workflows for display in a graphical user interface; and retraining the machine learning prediction model at least by iteratively applying the machine learning prediction model to additional training datasets and updating the machine learning prediction model based on results generated by iteratively applying the machine learning prediction model to the additional training datasets.

16. The system of claim 15, the operations further comprising identifying at least one step having a locked position in the sequence of the primary workflow.

17. The system of claim 16, the operations further comprising identifying at least one step having an unlocked position in the sequence of the primary workflow.

18. The system of claim 17, the operations further comprising identifying the locked position relative to the unlocked position in the sequence of the primary workflow.

19. The system of claim 18, the operations further comprising identifying each position in the sequence where at least one step having the unlocked position can be placed while maintaining the position of at least one step having the locked position in the sequence of the primary workflow.

20. The system of claim 19, the operations further comprising generating a separate workflow for each position in the sequence where the at least one step having the unlocked position can be placed while maintaining the position of the at least one step having the locked position in the sequence of the primary workflow.

* * * * *